Feb. 10, 1959 J. AVINS 2,873,314

NOISE IMMUNE SIGNAL PROCESSING CIRCUIT

Filed Jan. 5, 1954

INVENTOR.
JACK AVINS
BY [signature]
ATTORNEY

United States Patent Office 2,873,314
Patented Feb. 10, 1959

2,873,314

NOISE IMMUNE SIGNAL PROCESSING CIRCUIT

Jack Avins, Staten Island, N. Y., assignor to Radio Corporation of America, a corporation of Delaware Application January 5, 1954, Serial No. 402,369
7 Claims. (Cl. 178—7.5)

The present invention relates to that class of circuits known generically in the art as "clamp circuits" and, more particularly, to circuits of the type which are designed to clamp recurrent maximum or minimum portions of a signal to a predetermined reference voltage level.

In the television art, a field in which the present invention finds widespread utility, there are many instances wherein it is necessary to clamp the composite video signal to a fixed voltage reference level. By way of illustration, the composite signal, after passage through certain A. C. couplings, no longer possesses its direct current component, which component is a measure of the average scene brightness for background level. Instead, the signal is balanced about its A. C. axis, thus requiring that some means be provided for re-establishing its direct current axis. A convenient and well-known agency for accomplishing such a result, known as "clamp" or "D. C. level setter," is a diode arrangement such as that described in U. S. Patent No. 2,252,746 granted August 19, 1941, to P. W. Willans. A diode type of clamp circuit exploits the fact that television synchroning ("sync") pulses, which have a regular repetition rate, are initially of equal amplitude. By measuring the difference between the tips of the sync pulses and the A. C. axis, the diode is able to restore the D. C. component to the signal.

In practice, it has been found that a noise impulse extending in the same direction as, but with greater amplitude than, the sync pulse constitutes a source of difficulty, in that the clamp circuit tends to reference or "set up" on the noise pulse rather than on the sync pulse. Since it is, as has been stated, a prerequisite to proper clamping that the clamp circuit operate upon pulses of equal amplitude, such setting up on noise tips produces spurious brightness effects.

It is, therefore, an object of the present invention to provide new and improved clamp circuit means of the type which "sets up" on the maximum or minimum peaks of a signal, which means is substantially immune to impulse noise.

In general, the present invention contemplates the provision of a clamping circuit which functions in a manner similar to that of the diode type of clamp referred to supra. Rather than a simple diode, however, the present invention provides a clamp in the form of a control grid device having an anode and a cathode.

According to a specific embodiment, the anode is connected to the point of the circuit to be clamped while the cathode is connected to a point of fixed reference potential. Means are additionally provided for detecting the presence of noise impulses which extend beyond the tips of sync pulses and for coupling such excessive portions of the impulses to the control grid of the clamping tube in such manner as to prevent its conduction during that portion of the noise impulse.

Thus it is a further object of the invention to provide clamping means, as set forth, including means for rendering the clamp inoperative during the occurrence of noise impulses.

As will be seen from the following portions of the specification, the present invention, while relatively simple and inexpensive, affords extremely dependable service in clamping recurrent pulses to a fixed voltage level.

Additional objects and advantages of the present invention, will become apparent to those skilled in the art from a study of the following detailed description of the accompanying drawing in which.

Figures 1, 2, 3:
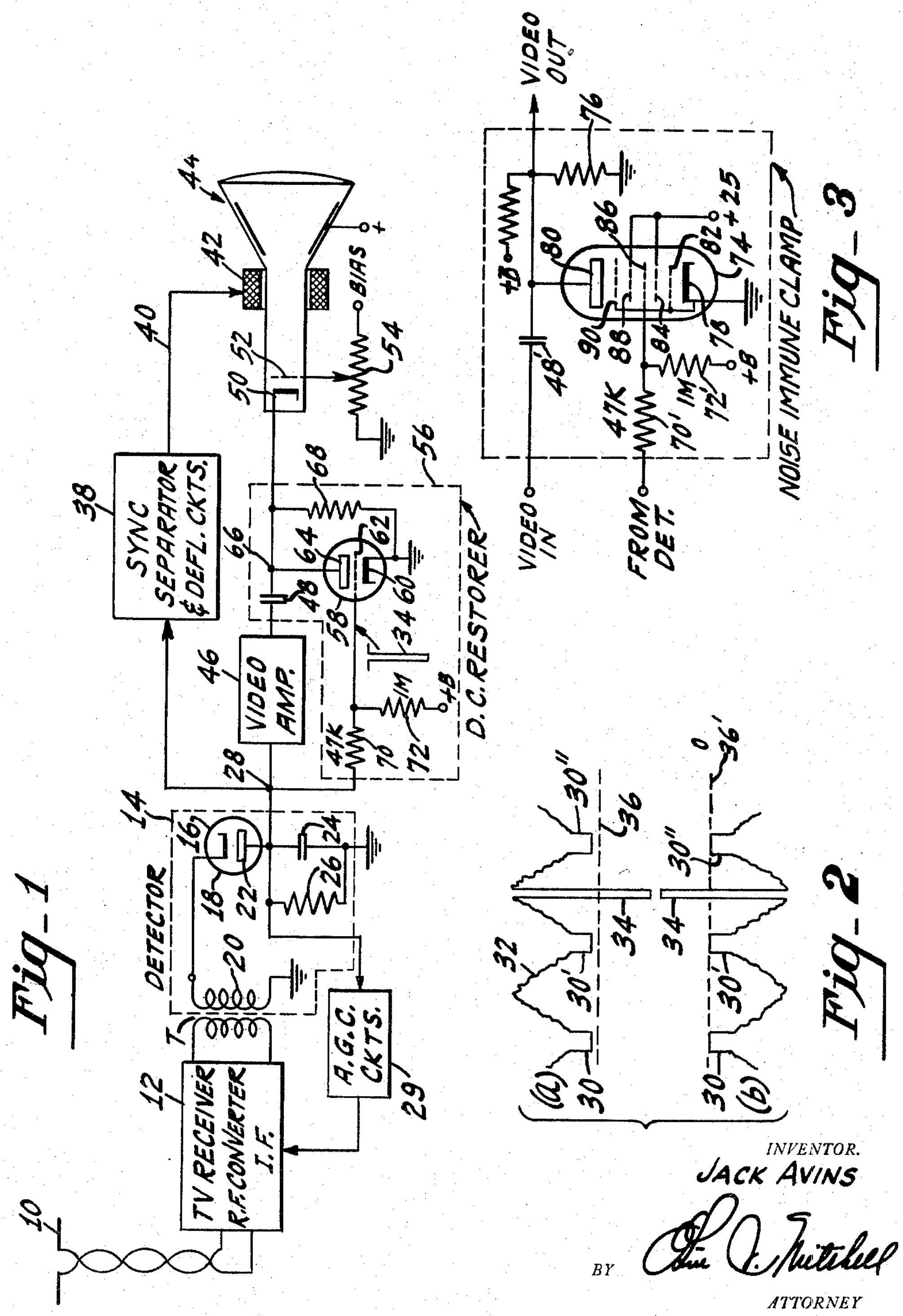
Figure 1 illustrates, by way of block and schematic circuit diagram, a television receiver embodying the principles of the present invention.
Figure 2 illustrates waveforms useful in describing the invention.
Figure 3 is a schematic diagram of another form of the invention.

Referring to the drawing, and, more particularly, to Figure 1 thereof, there is provided an antenna 10 which intercepts and applies to the tuner portion 12 of a television receiver, a composite television signal of the usual form which includes video portions, recurrent line and field sync pulses and noise impulses. The tuner 12 may, as illustrated, comprise the usual radio frequency, converter, and intermediate frequency amplifiers. The final I. F. amplifier is coupled by means of transformer T to conventional detector 14 which comprises, for example, a diode 16 whose cathode 18 is connected to the ungrounded end of the transformer secondary 20 and whose anode 22 is connected to ground via the filter arrangement comprising the parallel combination of capacitor 24 and resistor 26. At the output of detector diode 16, at terminal 28, there is available the demodulated video signal such as that shown by waveform (*a*) of Figure 2, which waveform comprises successive line synchronizing pulses 30, 30′ and 30″, video signals 32 and noise impulses or spikes 34. This composite signal is applied to sync separator and deflection circuits 38 which may be of any conventional variety and which perform the function of separating the sync pulses from the composite signal whereby to trigger the horizontal and vertical deflection circuits in a well-known manner. A lead 40 illustrates diagrammatically the path by which the deflection circuits apply suitable deflection current waveforms to the deflection yoke 42 which is disposed in operative relationship with an image reproducing kinescope 44. The composite signal at terminal 28 is also amplified as by video amplifier 46 and coupled via capacitor 48 to a signal electrode 50 of the kinescope. Merely in the interest of completeness of description, there is also illustrated a conduction controlling electrode 52 which is connected to a suitable bias source 54 for setting the operating point for the kinescope. An A. G. C. circuit 29 is or may be coupled between the output of detector 14 and the I. F. amplifiers, as shown, for maintaining the signal level constant despite variations in received signal strength.

Since, as has been stated, the composite signal, when produced at the transmitter, contains a direct current component which is a function of the background or brightness level of the televised scene, and since the direct current component is lost when the signal passes through such A. C. couplings as the condenser 48, the D. C. restorer circuit 56 is provided in accordance with the invention. More specifically, the video amplifier 46 has available at its output terminal a signal which is a substantial replica of waveform (*a*) in Figure 2 with the exception that its polarity is reversed, so that the sync pulses 30, 30′ and 30″ extend in a positive direction. The D. C. restorer 56 comprises in the instant case a triode 58 having a cathode 60, control electrode 62 and anode 64. The anode of triode 58 is connected to terminal 66 at the right hand side of coupling capacitor 48 while its cathode 60 is connected to a point of fixed reference potential such as "ground." A large resistor 68 is also connected between terminals 66 and the cathode of diode 58. Considering tube 58 as a triode (i. e. disregarding its control electrode 62 for a moment) it will be seen that the tube and parallel resistor 68 function with the capacitor 48 to clamp the incoming signal (waveform (*b*) of Figure 2) to the fixed potential level shown by dotted line 36'.

Since the operation of a diode level setter is now well known to those skilled in the art it need not be described in detail here. Briefly, however, it will be understood that incoming sync pulses such as those shown at 30, 30' and 30" will tend to charge the capacitor 48 to their value. In order that the capacitor may be repeatedly charged to match the amplitude of the sync pulses, tube 58 provides a rapid conduction path therefor. Between sync pulses, the discharge path for capacitor 48 consists of the large resistor 68 which, in conjunction with the capacitor, forms a rather long time constant. Thus, after the first several sync pulses have been received, the capacitor 48 will be charged to a value almost equal to the sync pulses so that the tips of succeeding sync pulses will cause the tube 58 to conduct in order to charge the capacitor to its required value. In this manner, the composite signal is clamped as shown in waveform (*b*) in Figure 2.

As thus far described, no mention has been made of the effect of the noise impulse 34 upon the clamping action of tube 58. Noise impulses, extending in the same direction as and having greater amplitude than the sync pulses, will also cause the diode to conduct and will charge the capacitor undesirably in a manner which produces deleterious effects upon the final image of kinescope 44. In accordance with the present invention, terminal 28 at the output of the diode 16 is connected, via the voltage selecting network comprising resistors 70 and 72, to the control electrode 62 of clamp triode 58. The end of resistor 72 remote from the control electrode 62 is connected to a source of positive potential (indicated as +B) and the values of resistors 70 and 72 in conjunction with the voltage of the +B terminal are selected so that only those noise impulse portions which are of greater amplitude than the sync pulses are applied to cut off the triode 58. A noise pulse 34 extending in the negative direction is illustrated as being applied to the control electrode of that device. Stated otherwise, resistor 70 and 72 together with the positive potential +B select that portion of each noise pulse which extends more negatively than the synchronizing pulses, and the "excess" is applied to the control electrode 62 of triode 58 to cut off plate current condition therein.

The action of the A. G. C. circuit 29 insures that the signal level at terminal 28 does not rise above the threshold level set by resistors 70 and 72.

From the foregoing it will be appreciated that, in the operation of circuit of Figure 1, tube 58 will serve as a conventional diode to clamp the incoming signal to a fixed level of potential and, in the absence of noise, will perform much in the manner of a diode. Upon the occurrence of a noise spike 34 which is of sufficient amplitude to be passed by resistors 70 and 72, tube 58 will be cut off, thereby preventing the capacitor 48 from charging up to the tip of the noise spike. Hence, no clamping on signals other than the desired sync signals occurs.

Figure 3 illustrates another form of D. C. restorer or clamp device in accordance with the invention. In this embodiment, there is included a coupling capacitor 48' connected between the output of video amplifier and the signal electrode of a kinescope, the rapid charging path for the capacitor constituting a pentagrid tube 74 and the discharge path for the capacitor consisting of the resistor 76. The pentagrid tube 74 comprises a cathode 78, anode 80 and five grids 82, 84, 86, 88 and 90. Connected to the grid 86 is a resistive pulse selecting network comprising resistors 70' and 72', one end of the latter resistor being connected to +B and the remote end of the former resistor being connected to the video detector as indicated. Grid 90 is or may be directly connected to cathode 78; grid 82 is connected directly to cathode 78 and the screen grids 84 and 88 are connected to a source of positive potential as shown.

In the operation of the circuit of Figure 3, the pentagrid tube 74 serves as a sharp cutoff device which, in the absence of noise impulses applied to its grid 86, affords a low resistance charging path for capacitor 48'. The discharge path for the capacitor is again a large resistance 76 which prevents rapid loss of charge. Noise impulses of greater amplitude than sync pulses are selected from a level which is over that of the sync pulses by means of resistors 70', 72' and bias +B and are applied to grid 86 in such manner as to prevent conduction of tube 74. Thus, the capacitor is prevented from charging up to the value of the noise pulses and the D. C. clamping remains unaffected by the noise.

While the invention has been illustrated in accordance with certain specific forms, those skilled in the art will recognize the fact that other types of control grid devices may be employed in place of the triode and pentagrid converter described. It will, moreover, be understood that the present invention requires only the substitution of a grid control device for a two-element unilaterally-conductive device and that, despite its relative simplicity, it serves to prevent "setting up" on noise impulses. Additionally, it should be borne in mind that, although the invention has been described in accordance with a clamp circuit located at the input of a cathode-ray image device, the invention is equally applicable and finds utility in other locations wherein clamp circuits are desirable or necessary. For example, another useful application in a television receiver is that of utilizing the output of the noise immune clamp described above to trigger a noise inverter so as to prevent the sync separator from setting up on noise.

Having thus described my invention, what I claim as new and desire to secure by Letters Patent is:

1. In a television receiver having an image reproducing device which includes a signal input terminal, direct current level setting apparatus adapted to clamp the peaks of recurrent synchronizing pulses included in a composite television signal to a fixed potential, said composite signal further including video signals of lesser amplitude and noise impulses of greater amplitude than said synchronizing pulses, said level setting apparatus comprising: a source of such composite signal; means including a coupling capacitor connecting said source to said signal input terminal of said image-reproducing device; a unilaterally conductive device having a conduction controlling electrode means connecting said unilaterally conductive device between the point of such fixed potential and said input terminal of said image reproducing device in such manner as to be rendered conductive by said recurrent pulses; and means coupling said signal source to said electrode for rendering said unilaterally conductive device non-conductive in response to noise pulses of greater amplitude than said synchronizing pulses.

2. The invention as defined by claim 1 wherein said unilaterally conductive device comprises an electronic tube having anode and cathode elements, one of said elements being connected to said point of fixed potential and the other of said elements being connected to said signal input terminal of said image reproducing device.

3. The invention as defined by claim 1 wherein said last-named means comprises a pulse-selecting circuit responsive to pulses of greater amplitude than the amplitude of said synchronizing pulses.

4. The invention as defined by claim 1 wherein said last-named means comprises a first impedance connected between said signal source and said conduction-controlling electrode, a source of bias potential, and a second impedance connected between said bias source and said conduction controlling electrode.

5. In a television receiver adapted to receive a composite signal comprising a carrier wave modulated by recurrent synchronizing pulses of fixed amplitude, video signals of lesser amplitude and noise impulses of greater amplitude than said synchronizing pulses, said receiver including a detector for demodulating said carrier wave whereby to provide said composite signal with said synchronizing pulses and noise impulses of a given polarity, image-reproducing means having a signal input terminal, means for clamping said synchronizing pulses to a fixed reference potential, which comprises: a source of said composite television signal; a unilaterally conductive device having cathode and anode elements and a control electrode; coupling means including a capacitor for applying said composite signal from said detector to said signal input terminal of said image reproducing means; means connecting one of said cathode and anode elements to a point of fixed reference potential, and the other of said ode and anode elements of said unilaterally conductive device to the junction between said signal input terminal and said capacitor such that said device is rendered conductive by at least a portion of said synchronizing pulses; and means operatively connecting said detector to said conduction controlling electrode for cutting off anode current in said device in response to noise impulses of greater amplitude than said synchronizing pulses.

6. The invention as defined by claim 5 wherein said last-named means comprises a first resistor connected between said detector and said electrode, a source of bias potential, and a second resistor connected between said electrode and said source of bias, said resistors and bias source being of such value as to pass impulses of greater amplitude than that of said synchronizing pulses.

7. In a television receiver for receiving a composite signal comprising a carrier wave modulated by recurrent synchronizing pulses of fixed amplitude, video signals of lesser amplitude and noise impulses of greater amplitude than said synchronizing pulses, said receiver including a detector for demodulating said carrier wave to derive said composite signal with synchronizing pulses and noise impulses of a given polarity, a video amplifier having a signal input circuit and a signal output circuit, means connecting said detector with said signal input circuit for applying the composite signal to said video amplifier, image reproducing means having a signal input terminal, and a coupling circuit including a capacitor connected between said signal output circuit and the signal input terminal of said image reproducing means, a direct current reinsertion circuit for clamping said synchronizing pulses to a fixed reference potential comprising: an electron discharge device having anode, cathode and control electrodes; means connecting one of said cathode and anode electrodes of said electron discharge device to the signal input terminal of said image reproducing means and the other of said cathode and anode electrodes to said point of fixed reference potential in a manner that the polarity of said synchronizing pulses at said signal input terminal tends to render said device conductive; means connected between said detector and said control electrode for applying said noise impulses in negative going polarity to said control electrode; biasing means connected with said control electrode for cutting off anode current in said device in response to noise impulses of greater amplitude than said synchronizing pulses; and means providing a discharge path for said capacitor including a resistor connected between input terminals of said image reproducing means and said point of fixed reference potential.

References Cited in the file of this patent

UNITED STATES PATENTS 2,521,146 Blayney ---------------- Sept. 5, 1950
2,736,769 Macovski ---------------- Feb. 28, 1956

FOREIGN PATENTS 1,042,291 France ---------------- Oct. 30, 1950
145,870 Australia ---------------- Mar. 25, 1932

OTHER REFERENCES

Rider's Television Manual, vol. 10, Zenith TV, page 10–29, copyrighted November 21, 1952.

UNITED STATES PATENT OFFICE

CERTIFICATE OF CORRECTION

Patent No. 2,873,314 February 10, 1959

Jack Avins

It is hereby certified that error appears in the printed specification of the above numbered patent requiring correction and that the said Letters Patent should read as corrected below.

Column 3, line 5, for "diode" read -- triode --; same line 5, for "triode" read -- diode --; line 53, for "condition" read -- conduction --; column 5, line 22, claim 5, for "ode" read -- cathode --.

Signed and sealed this 15th day of December 1959.

(SEAL)
Attest:

KARL H. AXLINE
Attesting Officer

ROBERT C. WATSON
Commissioner of Patents